US008184984B1

(12) United States Patent
Wang

(10) Patent No.: US 8,184,984 B1
(45) Date of Patent: May 22, 2012

(54) OPTICAL TRANSCEIVER HAVING A MODULATING COMPONENT

(75) Inventor: Steve Wang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 1352 days.

(21) Appl. No.: 10/430,465

(22) Filed: May 5, 2003

Related U.S. Application Data

(60) Provisional application No. 60/426,139, filed on Nov. 13, 2002.

(51) Int. Cl.
*H04B 10/04* (2006.01)
(52) U.S. Cl. .......................... 398/135; 398/183; 398/201
(58) Field of Classification Search ................... 398/135, 398/201, 183, 128, 129, 136, 137, 138, 139
See application file for complete search history.

(56) References Cited

U.S. PATENT DOCUMENTS

| | | | | |
|---|---|---|---|---|
| 4,335,939 A | * | 6/1982 | Stovell et al. | 359/247 |
| 4,601,575 A | * | 7/1986 | Tamaki | 356/124 |
| 4,751,378 A | * | 6/1988 | Hinton et al. | 250/214 LS |
| 5,426,312 A | * | 6/1995 | Whitehead | 257/21 |
| 5,608,565 A | * | 3/1997 | Suzuki et al. | 359/237 |
| 5,889,607 A | * | 3/1999 | Suzuki et al. | 359/245 |
| 5,937,116 A | | 8/1999 | Seto | |
| 5,956,168 A | * | 9/1999 | Levinson et al. | 398/41 |
| 6,342,960 B1 | | 1/2002 | McCullough | |
| 6,462,877 B1 | * | 10/2002 | Hait | 359/583 |
| 6,509,992 B1 | * | 1/2003 | Goodwill | 398/131 |
| 6,826,209 B1 | * | 11/2004 | Morita et al. | 372/26 |
| 7,010,233 B2 | * | 3/2006 | Lindblad | 398/164 |
| 2002/0071621 A1 | * | 6/2002 | Yamada | 385/2 |
| 2002/0109904 A1 | * | 8/2002 | MacDonald et al. | 359/291 |
| 2002/0154364 A1 | * | 10/2002 | Green et al. | 359/172 |
| 2003/0035174 A1 | * | 2/2003 | Fujii | 359/135 |
| 2003/0039010 A1 | * | 2/2003 | Akimoto et al. | 359/152 |
| 2003/0147652 A1 | * | 8/2003 | Green et al. | 398/118 |

OTHER PUBLICATIONS

GaInAs/GaAs strained layer MQW Electroabsorption optical modulator and self electro-optic effect device, Electronics letters Mar. 1988 vol. 24 No. 5 to Dobbelaere et al.*

* cited by examiner

*Primary Examiner* — Nathan Curs
(74) *Attorney, Agent, or Firm* — Maschoff Gilmore & Israelsen

(57) ABSTRACT

An optical transceiver device including a modulating assembly. In contrast with conventional transceivers, the optical transceiver device uses a modulating assembly rather than a laser. The modulating assembly is located within the transceiver itself and includes first and second collimating lenses, first and second mirrors, and a p-i-n diode. An optical signal that has not yet been modulated is introduced into the modulating assembly via the first collimating lens, and is redirected toward the p-i-n diode via the first mirror. Depending on the voltage state of the diode, the light signal is either transmitted through the diode or prevented from passing, which results in modulation of the signal for data transmission. The modulated signal passes through the modulating assembly and is reflected by the second mirror toward the second collimating lens, through which it passes before exiting the transceiver.

12 Claims, 4 Drawing Sheets

OPTICAL TRANSCEIVER HAVING A MODULATING COMPONENT

RELATED APPLICATION

This application claims the benefit of U.S. Patent Application Ser. No. 60/426,139, filed Nov. 13, 2002, which is incorporated herein by reference.

BACKGROUND OF THE INVENTION

1. The Field of the Invention

The present invention generally relates to optical transceivers employed in optical communications systems. More particularly, the present invention relates to an optical transceiver that incorporates a modulating component for encoding communications data onto an optical signal.

2. The Related Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks typically employ optical transceivers in transmitting information via the network from a transmission node to a reception node. At the transmission node, typical optical transceivers receive an electrical data signal from a network device, such as a computer, and convert the electrical data signal to a modulated digital optical data signal using a laser. Thus, production of a pulse of light by the laser can correspond to a digital "one" or "zero," while no pulse corresponds to a "zero" or "one," respectively, according to the configuration of the network. The modulated optical data signal produced by the laser can then be transmitted in a fiber optic cable via the optical network, such as a LAN backbone, for instance.

The optical data signal is transmitted to and received by a reception node of the network. Once received by the reception node, the optical data signal is fed to another optical transceiver for conversion into electrical data signals. The electrical data signals are then forwarded to a host device, such as a computer, for processing. The optical transceivers described above have both signal transmission and reception capabilities; thus, the transmitter portion of the transceiver converts an incoming electrical signal into an optical signal, whereas the receiver portion of the transceiver converts an incoming optical signal into an electrical signal.

The majority of components included in the optical transceiver are disposed on a printed circuit board ("PCB"). These components include a controller, which governs general operation of the transceiver, a laser driver for controlling operation of the laser in the transmitter portion, and a post-amplifier for controlling the conversion of incoming optical signals into electrical signals in the receiver portion. These components are typically configured as integrated circuits on the PCB.

Despite their utility, traditional laser-based transceivers are confronted by various challenges. Among these is laser chirp, which refers to the drifting of the frequency of the optical signal produced by the transceiver. Laser chirp is temperature dependent: as the laser temperature varies during operation, the frequency drift of the light signal can likewise vary. As it affects the quality of the optical signal produced by the transceiver, laser chirp can represent a significant problem to be overcome during transceiver operation.

To acceptably deal with the above, lasers must be designed to mitigate the effects of laser chirp and related challenges. Unfortunately, this requires that the transceiver be implemented with a variety of devices, including temperature controllers, laser bias controls, wavelength locking components, and other circuitry for adjusting transceiver components as necessary. Not only does this increase the cost of the transceiver in terms of added manufacturing steps, it also increases the complexity of the device.

There is therefore a need for an optical transceiver that comprises a simple design and that can provide for the reliable modulation of data onto an optical signal. It would be a further benefit to provide an optical transceiver that operates free from the effects of frequency chirp, thereby negating the need for additional control circuitry.

BRIEF SUMMARY OF THE INVENTION

Briefly summarized, embodiments of the present invention are directed to an optical transceiver device including a modulating assembly. The present transceiver stands in contrast to typical transceivers in that the lasing component is replaced by the modulating assembly. The modulating assembly is located within the transceiver itself and comprises first and second collimating lenses, first and second mirrors, and a p-i-n diode. An un-modulated optical signal is introduced into the modulating assembly via the first collimating lens, and is redirected toward the p-i-n diode via the first mirror. Depending on the voltage state of the diode, the light signal is either transmitted through the diode or prevented from passing. In this way, the light signal is modulated for data transmission. The modulated light signal that is allowed to pass through the modulating assembly is reflected by the second mirror toward the second collimating lens, through which it passes before exiting the transceiver. The receiver portion of the transceiver is unaffected by the modulating assembly, and operates in its typical manner.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1-3B depict various features of embodiments of the present invention, which is generally directed to an optical transceiver including a modulating assembly. The modulating assembly is used in lieu of a laser to encode data onto an optical signal for transmission via an optical communications network. In other words, the transceivers generally do not have lasers or other internal source of light, and the data is modulated onto the channels without the transceivers using internal sources of light. Instead, the transceivers use an external source of light as described herein. The channels λ are combined by a multiplexor and are transmitted to an optical communications network (not shown) for receipt by a remote device Utilization of the modulating assembly enables simplification of the transceiver design, thereby reducing the complexity and cost of the transceiver.

Figure 1:
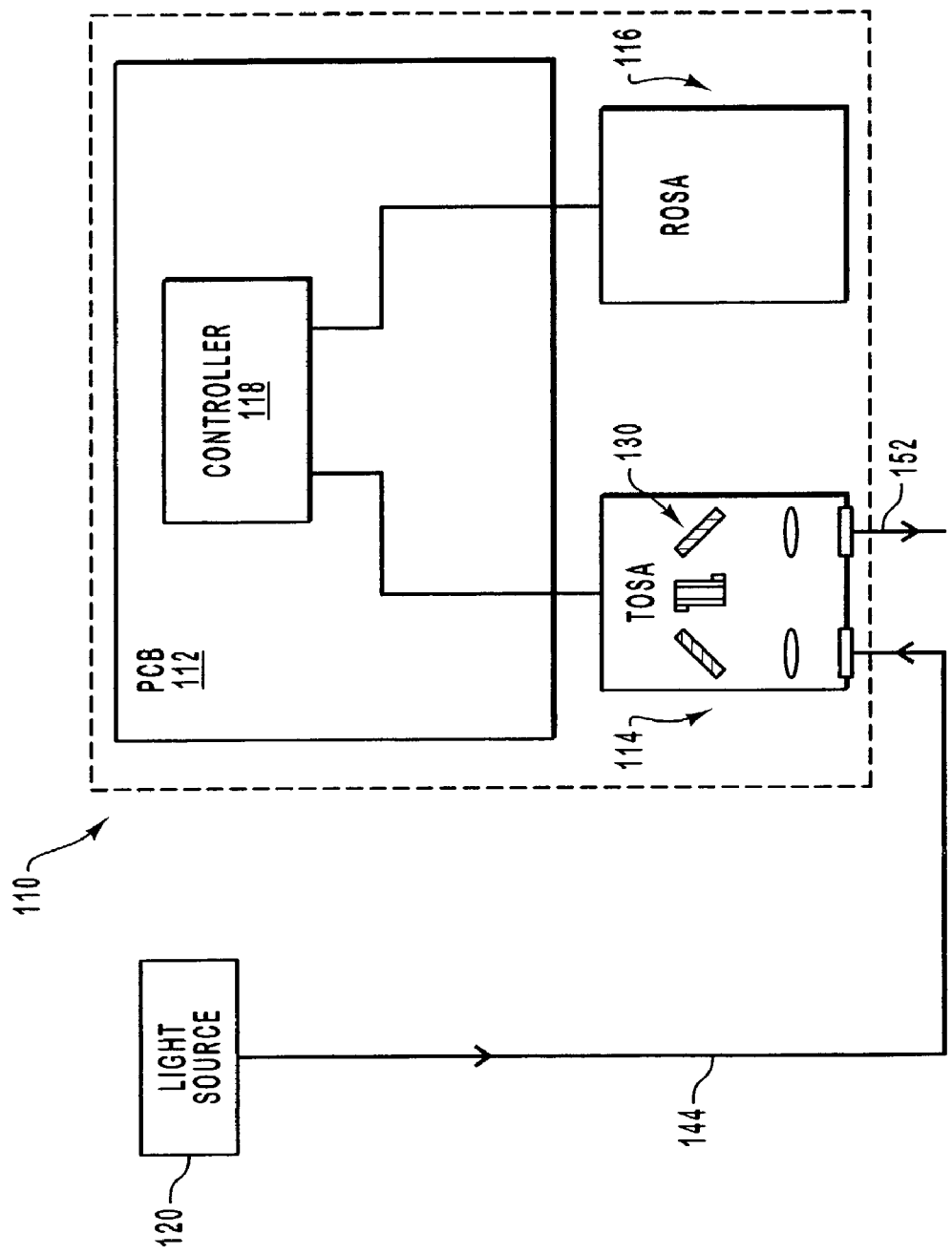
FIG. 1 is a block diagram depicting various components comprising the present optical transceiver according to one embodiment.

Reference is first made to FIG. 1, which depicts various components comprising one embodiment of the present optical transceiver, generally designated at 110. The transceiver 110 generally includes a printed circuit board ("PCB") 112, a transmitter optical subassembly ("TOSA") 114, and a receiver optical subassembly ("ROSA") 116.

Both the TOSA 114 and the ROSA 116 are connected to a controller 118 that enables the transceiver 110 both to transmit and to receive optical signals that travel via an optical communications network (not shown). As will be explained, the controller 118 is responsible (along with other possible components not explicitly shown) for governing the operation of the TOSA 114, and the ROSA 116. It is appreciated that the controller 118 of the optical transceiver 110 depicted in FIG. 1 can control additional components not explicitly mentioned here that cooperate to provide the functionality of the transceiver.

The ROSA 116 is utilized in the present transceiver 110 to receive incoming optical data signals from the communications network and convert them into electrical data signals that can be used by a host device (not shown) connected to the transceiver. Correspondingly, the TOSA 114 is utilized to convert electrical data signals from the host device into optical data signals for transmission via the communications network. In accordance with embodiments of the present invention, the TOSA 114 converts the electrical data signals without the use of a laser, as in typical transceivers. Rather, the TOSA 114 directly modulates the data contained in an electrical data signal onto an un-modulated optical signal. The optical signal, preferably comprising a single, discrete wavelength, is provided by a light source 120 and is modulated by the TOSA 114 to provide a modulated optical data signal that can be transmitted by the transceiver 110 to the communications network for receipt by a remote host device (not shown). One example of a light source that can be employed as light source 120 is found in U.S. Provisional Patent Application Ser. No. 60/426,116, entitled "Light Source Library for Arranging Optical Signals," filed on Nov. 13, 2002, and which is incorporated herein by reference in its entirety. Further details concerning the operation of both the TOSA 114 and the transceiver 110 are given further below.

Figure 2:
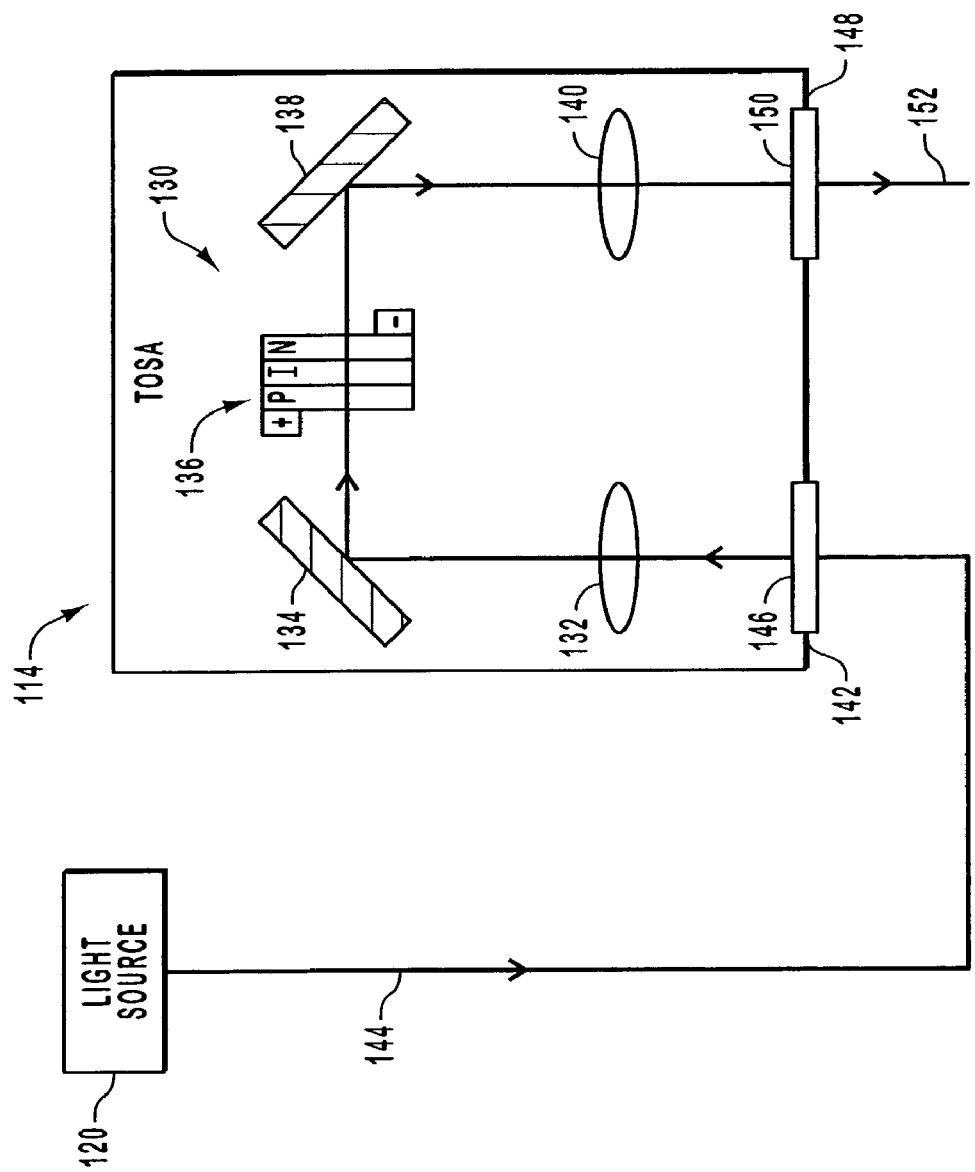
FIG. 2 is a schematic view of several of the components of the transmitter portion of the optical transceiver of FIG. 1, including a p-i-n diode.

Reference is now made to FIG. 2 in describing various details concerning the TOSA 114. As can be seen, the TOSA 114 includes a modulating assembly 130 generally comprising a first collimator 132, a first mirror 134, a modulator 136, a second mirror 138, and a second collimator 140. The modulating assembly 130 as will be described is utilized to provide a modulated optical data signal for use in an optical communications network. Details concerning the structure and operation of each of these components is described below.

A wavelength-distinct, un-modulated optical signal produced at the light source 120 is introduced into the TOSA 114 via an inlet 142. In one embodiment, the un-modulated optical signal is transmitted to the TOSA 114 via a fiber optic cable 144 connecting the light source 120 to the TOSA. A first connector 146, such as an LC connector, mates the fiber optic cable 144 to the TOSA 114 at the inlet 142.

The first collimator 132 is arranged within the TOSA 114 to collimate the un-modulated optical signal received by the TOSA 114 via the inlet 142. Any suitable type of collimating apparatus can be employed here, but in one embodiment the first collimator 132 comprises a collimating lens. As a result of passing through the first collimator, the un-modulated optical signal is shaped and focused as needed before proceeding on through the modulating assembly 130.

After passing through the first collimator 132, the un-modulated optical signal is directed to a first mirror 134, which redirects the signal toward the modulator 136. In the illustrated embodiment, the first mirror 134 is used to redirect the un-modulated optical signal at an angle of approximately 45 degrees. This configuration minimizes the space needed for the components of the modulating assembly 130.

As a result of its interaction with the first mirror 134, the un-modulated optical signal is directed to and incident upon the modulator 136. As will be explained, the modulator 136 is utilized to modulate digital data onto the optical signal, converting it from an un-modulated optical signal to a modulated optical signal suitable for transmission via an optical communications network. Generally speaking, the modulator 136 can be selectively cycled between a powered state and an un-powered state in rapid succession so as to selectively enable the optical signal to either pass through the modulator or be absorbed thereby. This selective transmission of the optical signal through the modulator 136 creates a series of light pulses representing either a digital "one" or "zero," depending on the configuration of the signal, which correspond to the data carried by electrical data signal. This in turn transforms the un-modulated optical signal, previously comprising a continuous stream of light waves, into a modulated, data-carrying optical signal, comprising a series of light pulses and light voids, which is now suitable for transmission via an optical communications network. Further details concerning this process are found further below.

After being modulated by the modulator 136, the optical data signal is directed to the second mirror 138, which redirects the signal at a 45-degree angle toward the second collimator 140. The second collimator 140, comprising in the illustrated embodiment a collimating lens, focuses and shapes the modulated optical data signal as needed before it exits the TOSA 114 via an outlet 148. A second connector 150 disposed at the outlet 148 enables the TOSA 114 to mate to a fiber optic cable 152. The fiber optic cable 152 then connects with an optical communications network (not shown) to enable the modulated optical data signal to be transmitted via the network to a remote reception node, as is well known. In one embodiment, the modulated optical data signal can be combined by a multiplexor, using wavelength division multiplexing techniques, with other modulated optical data signals to form a multiplexed data signal that is similarly transmitted via the network.

Figure 3B:
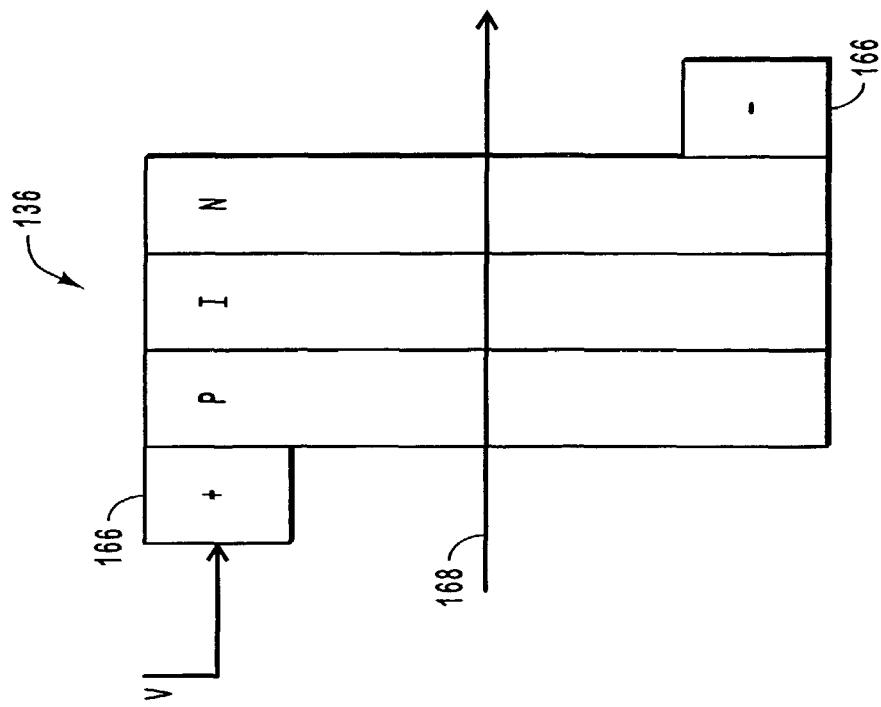
FIG. 3B shows the p-i-n diode of FIG. 2 in a second, transmissive state.
Figure 3A:
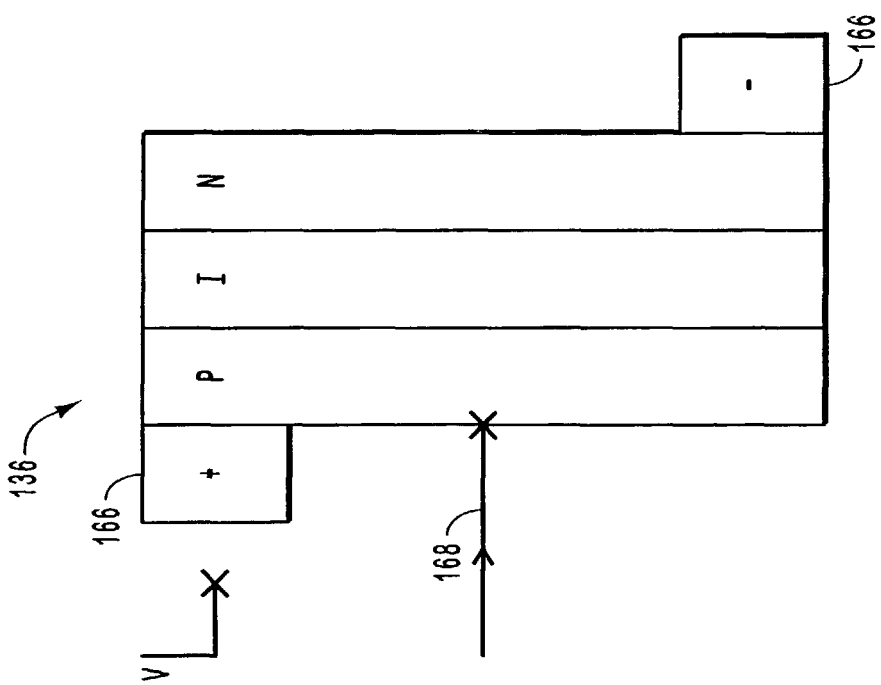
FIG. 3A shows the p-i-n diode of FIG. 2 in a first, absorptive state.

Reference is now made to FIGS. 3A and 3B in describing various details regarding the structure and operation of the modulator 136. In presently preferred embodiments, the modulator 136 comprises a semiconductor-based p-i-n diode having an intrinsic semiconductor 162 interposed between a p-type semiconductor 160 and an n-type semiconductor 164. The intrinsic semiconductor 162 in one embodiment comprises an indium-gallium-arsenide-phosphorus ("InGaAsP") composition. Other compositions for both the intrinsic semiconductor, as well as for the p- and n-type semiconductors 160 and 164, however, are also possible. Electrical contacts 166 are connected to the p-i-n diode to enable an electrical supply voltage V to be applied to the diode during transceiver operation.

In light of the above disclosure, it is appreciated that the modulator 136 can comprise other configurations with substantially the same functionality as will be described while still residing within the scope of the present invention. Moreover, one skilled in the art will also appreciate that the modulating assembly 130 can include different or additional components while still performing the functionality as discussed herein. Thus, these and other modifications to the present teachings are contemplated as comprising part of the invention.

FIG. 3A shows the above-described p-i-n diode, which comprises the modulator 136, in an absorptive first state encountered during operation of the optical transceiver 110. As can be seen, the supply voltage V is not being supplied to the p-i-n diode in FIG. 3A. This causes the p-i-n diode to absorb any optical signal incident upon it. An un-modulated optical signal, indicated at 168, that is directed to the p-i-n diode from the first mirror 134 (see FIG. 2), then, is absorbed by the p-i-n diode in this absorptive state and is prevented from passing through the diode to the second mirror 138.

In contrast, FIG. 3B shows the p-i-n diode in a transmissive second state encountered during operation of the optical transceiver 110. Here, the supply voltage V is supplied to the p-i-n diode, which causes it to transmit incident optical signals, such as the un-modulated optical signal shown at 168, that is received from the first mirror 134 (see FIG. 2). In this transparent state, then, the un-modulated optical signal 168 is allowed to pass through the p-i-n diode and proceed to the second mirror 138, as already discussed.

The absorptive and transmissive states of the p-i-n diode described above in connection with FIGS. 3A and 3B enable the modulating assembly 130 to modulate a data signal onto the un-modulated optical signal. A digital electrical data signal received from a host device connected to the optical transceiver 110 can be relayed to the modulator 136 (composed of the p-i-n diode) by the controller 118 or other appropriate device. The p-i-n diode is then selectively energized and de-energized in rapid succession by the supply voltage V as needed in coordination with the electrical data signal. This causes the p-i-n diode to correspondingly oscillate between its absorptive and transmissive states according to the electrical data signal and the supply voltage. This in turn causes the un-modulated optical signal incident on the p-i-n diode to either be absorbed by or transmitted through the p-i-n diode, thereby creating a pulsed light data stream, or modulated optical data signal, that corresponds to the electrical data signal, wherein the light pulses represent digital "ones" or "zeroes" of the electrical data. This modulation process occurs at the high speeds that are typical of optical communications networks such that data transmission via the present optical transceiver is not hindered.

Figure 4:
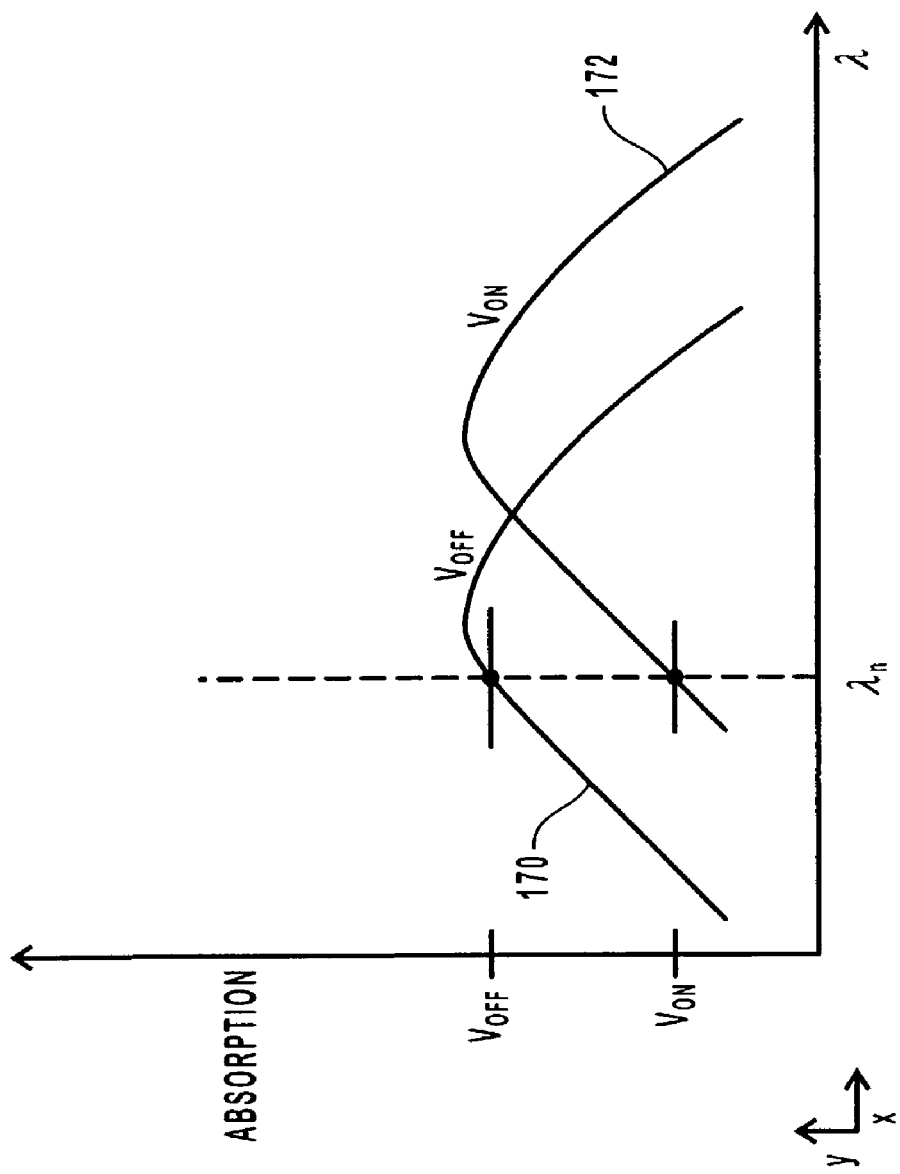
FIG. 4 is a graph showing the absorption spectra for the two operational states of the p-i-n diode of FIG. 2.

Reference is made to FIG. 4, which shows a chart depicting absorption spectra for both the absorptive and transmissive states of the p-i-n diode that comprises the modulator 136 as described above. A first curve 170 shows the absorption spectrum for a range of wavelengths, which are positioned along the x axis when the modulator 136 is in the absorptive state. The range of wavelengths includes $\lambda_n$ which represents the specific wavelength of the channel provided by the light source 120 to the TOSA 114. Similarly, a second curve 172 depicts the absorption spectrum for the same range of wavelengths, including $\lambda_n$, when the modulator 136 is energized by the supply voltage V, making the p-i-n diode transmissive to light signals. The y axis depicted in FIG. 4 represents the amount of optical signal absorption by the modulator p-i-n diode in both the absorptive and transmissive states. The absorption spectra depicted in FIG. 4 show that the amount of light absorption by the p-i-n diode when the supply voltage V is off is significantly higher than the absorption that occurs when the supply voltage is on. Thus, as already described in connection with FIGS. 3A and 3B, an incident optical signal $\lambda_n$ when the supply voltage V is off is substantially absorbed by the p-i-n diode. In contrast, an optical signal $\lambda_n$ incident on the p-i-n diode when the supply voltage V is on is substantially transmitted through the p-i-n diode and continues unhindered through the remaining portion of the modulating assembly 130. In this way, the un-modulated optical signal $\lambda_n$ is modulated into a series of light pulses and voids as already discussed.

FIG. 4 further suggests that the structure and/or composition of the p-i-n diode can be modified as desired so as to provide an appropriate absorption profile for an optical signal $\lambda_n$ having a specified wavelength. For example, the absorption spectra produced by the p-i-n diode can be modified by growing a lattice structure in the intrinsic semiconductor layer of the diode. Because of this, a single type of p-i-n diode can be used in various optical transceivers to modulate optical signals having a range of distinct wavelengths. For instance, in one embodiment a p-i-n diode of a particular configuration can be used to modulate optical signals having a wavelength existing anywhere within a range of approximately 40 nanometers. In this way, optical transceivers including p-i-n diodes having one of only four different configurations could be used in a CWDM or DWDM multiplexing system to modulate optical signals throughout the entire C-band, if desired. This provides added efficiency and simplicity to such systems.

One example where an optical transceiver as described herein can be utilized is found in U.S. Provisional Application Ser. No. 60/426,140, entitled "System for Modulating Optical Signals," filed on Nov. 13, 2002, and which is incorporated herein by reference in its entirety.

The present invention provides an alternative option for producing a modulated optical signal for use in optical communications networks and the like. Moreover, the modulating assembly negates various challenges that are common with laser-based transceivers, such as laser chirp. This in turn, eliminates the need for laser temperature controls, laser bias controls, wavelength locking components, and other control components associated with lasers, thereby simplifying transceiver design and reducing the costs of manufacture. In addition, p-i-n diodes are relatively easier to manufacture and produce than are traditional lasers disposed in known optical transceivers.

Another advantage derived from the present invention involves the coupling of a fiber optic cable to the optical transceiver. The end of a fiber optic cable typically possesses a relatively small cross sectional optical transmission area, typically in the range of 7 microns in diameter. The cross sectional optical area of a typical laser in known optical transceivers is typically on the order of only 1×2 microns. Thus, alignment of the laser output with the end of the fiber optic cable is difficult and often results in optical coupling efficiency losses of up to 50%. In contrast, the modulating assembly of the present invention can produce a modulated optical signal having a cross sectional diameter of 50 or even 100 microns. This enables the optical output of the modulating assembly to be easily coupled with the end of the fiber optic cable, resulting in a substantially greater coupling efficiency at the TOSA/cable interface.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An optical transceiver that operates without an internal source of light, comprising:
    a transmitter optical sub-assembly that includes:
    a first lens for collimating an optical signal that is input into the transmitter optical sub-assembly from a light source that is external to the optical transceiver, wherein the input optical signal is an unmodulated optical signal received from the external light source;
    a modulator switchable between an optically absorptive state and an optically transmissive state; and
    a first mirror positioned to direct substantially all of the optical signal received from the first collimating lens to the modulator such that the modulator can selectively absorb and
    transmit temporally separated portions of the optical signal to modulate data on the optical signal,
    wherein in the optically transmissive state the optical signal is transmitted from a side of the modulator other than a side on which the optical signal is incident, wherein the optical signal that is transmitted from the transmitter optical sub-assembly has a cross sectional diameter of between 50 and 100 microns.

2. An optical transceiver as recited in claim 1, further comprising:
    a second mirror positioned to re-direct the modulated optical signal that is transmitted by the modulator; and
    a second lens for collimating the modulated optical signal that is redirected by the second mirror before the modulated optical signal exits the transmitter optical sub-assembly.

3. An optical transceiver as recited in claim 1, wherein the modulator selectively absorbs and transmits the temporally separated portions of the optical signal by absorbing a first portion of the optical signal when the modulator is in the optically absorptive state and by transmitting a portion of the optical signal through the modulator when the modulator is in the optically transmissive state.

4. An optical transceiver as recited in claim 1, further comprising:
    a printed circuit board;
    a receiver optical sub-assembly disposed on the printed circuit board; and
    a controller connected to the receiver optical sub-assembly and to the transmitter optical sub-assembly.

5. An optical transceiver as recited in claim 1, wherein the transmitter optical sub-assembly further comprises:
    a p-type semiconductor;
    an n-type semiconductor; and
    an intrinsic semiconductor interposed between the p-type and n-type semiconductors.

6. An optical transceiver, comprising:
    a transmitter optical sub-assembly that includes:
    a first lens configured to collimate an optical signal that is input into the transmitter optical sub-assembly from a light source that is external to the optical transceiver, wherein the input optical signal is an unmodulated optical signal received from the external light source;
    a modulator electrically switchable between an optically absorptive state that corresponds to a digital "zero" and an optically transmissive state that corresponds to a digital "one"; and
    a first mirror positioned to direct substantially all of the optical signal received from the first collimating lens to the modulator,
    wherein in the optically transmissive state the optical signal is transmitted from a side of the modulator other than a side on which the optical signal is incident,
    wherein the modulator is a p-i-n diode having a non multi quantum well intrinsic semiconductor interposed between a p-type semiconductor and an n-type semiconductor, wherein the optical signal enters the modulator at the p-type semiconductor and leaves the modulator at the n-type semiconductor, wherein a positive electric contact is connected to the p-type semiconductor and a negative electric contact is connected to the n-type semiconductor, wherein the optical signal that is transmitted from the transmitter optical sub-assembly has a cross sectional diameter of between 50 and 100 microns.

7. An optical transceiver as recited in claim 1, wherein a speed with which the modulator is able to switch between states corresponds to a line rate of an associated electrical data signal.

8. An optical transceiver that operates without an internal source of light, comprising:
    a transmitter optical sub-assembly that includes:
    a first opening for receiving an optical signal that is input into the transmitter optical sub-assembly from a light source that is external to the optical transceiver, wherein the input optical signal is an unmodulated optical signal received from the external light source;
    a first lens adjacent the first opening for collimating the received unmodulated light source signal;
    a modulator switchable between an optically absorptive state and an optically transmissive state;
    a first mirror positioned to direct substantially all of the optical signal received from the first collimating lens to the modulator such that the modulator can selectively absorb and transmit temporally separated portions of the optical signal to modulate data on the optical signal, wherein the first mirror is positioned between the first lens and the modulator;
    a second minor positioned to re-direct the modulated optical signal that is transmitted by the modulator;
    a second lens for collimating the modulated optical signal that is redirected by the second minor, wherein the second minor is positioned between the first lens and the modulator;
    a second opening adjacent the second minor for providing the modulated optical signal to a source external to the transmitter optical sub-assembly,
    wherein in the optically transmissive state the optical signal is transmitted from a side of the modulator other than a side on which the optical signal is incident,
    where in the modulator is a p-i-n diode having a intrinsic semiconductor of indium-gallium-arsenide-phosphorus (InGaAsP) interposed between a p-type semiconductor and an n-type semiconductor, wherein the optical signal enters the modulator at the p-type semiconductor and leaves the modulator at the n-type semiconductor, wherein a positive electric contact is connected to the p-type semiconductor and a negative electric contact is connected to the n-type semiconductor, wherein the optical signal that is transmitted from the transmitter optical sub-assembly has a cross sectional diameter of between 50 and 100 microns.

9. An optical transceiver as recited in claim 8, wherein the first and second mirrors are at 45 degree angles.

10. A wavelength multiplexing system comprising:
a first transmitter optical sub-assembly;
a second transmitter optical sub-assembly,
each of the first and second transmitter optical sub-assemblies including:
a lens for collimating an unmodulated optical signal that is input from an external light source;
a modulator switchable between an optically absorptive state and an optically transmissive state with respect to a predetermined optical wavelength; and
a mirror positioned to direct the optical signal received from the collimating lens to the modulator such that the modulator can selectively absorb and transmit temporally separated portions of the unmodulated optical signal to modulate data on the unmodulated optical signal, the modulator transmitting the modulated optical signal from a side thereof other than a side on which the unmodulated optical signal is received, wherein the modulated optical signal that is transmitted from the modulator transmitter optical sub-assembly has a cross sectional diameter of between 50 and 100 microns.

11. The wavelength multiplexing system of claim 10,
wherein the modulator of the first transmitter optical sub-assembly absorbs a first predetermined optical wavelength in its optically absorptive state and transmits the first predetermined optical wavelength in its optically transmissive state, and
wherein the modulator of the second transmitter optical sub-assembly absorbs a second predetermined optical wavelength in its optically absorptive state and transmits the second predetermined optical wavelength in its optically transmissive state, the second predetermined optical wavelength differing from the first predetermined optical wavelength.

12. An optical transceiver as recited in claim 6, wherein the intrinsic semiconductor includes indium-gallium-arsenide-phosphorus (InGaAsP).

* * * * *